Figure 1:
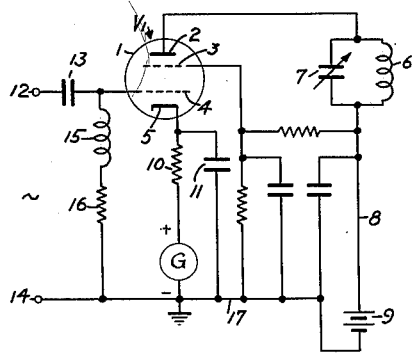

Feb. 26, 1952   H. B. STEINHAUSER   2,586,880
RESONANCE INDICATOR
Filed Nov. 12, 1949

INVENTOR
HAYES B. STEINHAUSER
BY R. P. Morris
ATTORNEY

Patented Feb. 26, 1952

2,586,880

UNITED STATES PATENT OFFICE 2,586,880

RESONANCE INDICATOR

Hayes B. Steinhauser, Montclair, N. J., assignor to Federal Telephone and Radio Corporation, New York, N. Y., a corporation of Delaware Application November 12, 1949, Serial No. 126,845

4 Claims. (Cl. 250—40)

1

The present invention relates to improvements in resonance indicators for radio transmission and video transmission apparatus.

The present invention has for its object to provide a resonance indicating device capable of giving an accentuated indication easily recognizable by an operator.

Another object of the invention is to obtain an accentuated indication of a resonance indicating device, even though the indicator be in a circuit which normally does not experience large current changes.

In adjusting continuous wave radio transmission and video transmission apparatus, care must be taken to avoid damaging the electron discharge tubes or circuit components by current overload. As is well-known to those skilled in the art, at the exact point of resonance in the resonant circuit, the current applied to the circuit is at a minimum.

Generally, a meter is utilized to measure the current drawn by an electron tube in a resonant circuit; the meter acting as a visible indication of the consumed curent. Thus, it is the practice to vary the effective LC constants of a resonant circuit, while observing the meter indicator, which meter is placed in the discharge path of the electron tube. When the space current decreases to a minimum, as revealed by the meter reading, the circuit is resonant at a particular frequency, such frequency being determined by the parameters of the circuit.

In tuning transmitters of the oscillator-amplifier type, it is known that grid current will flow in the grid circuit of a driven amplifier tube when the circuit of the driving amplifier is tuned to resonance. Maximum grid current in the driven tube coincides with minimum space current of the driving tube; the point of resonance.

Screen grid tubes draw a fairly constant level of current when they are coupled to an output load. Thus, a screen grid tube in a resonant circuit experiences a comparatively small current dip at resonance. It is highly desirable that an operator of radio transmission or video transmission apparatus observe an accentuated resonant dip in order that he may not exceed the current-carrying capabilities of the tubes and associated equipment.

According to my invention, I have provided a novel arrangement whereby an accentuated dip of the resonance indicator may be obtained even though screen grid tubes may be utilized, thus giving a clear and accentuated indication to an operator of conditions within the circuit. According to a feature of my invention, I provide an indicating device to indicate a reduction in space current drawn by an amplifier tube when its associated circuit is tuned to resonance and further provide means for rectifying at least a portion of the tuned circuit energy and applying said rectified energy to said indicating device in a direction opposite to that of said space current, thereby indicating the algebraic sum of such currents, which results in an accentuated indication of the device readily recognizable by the operator.

Figure 2:
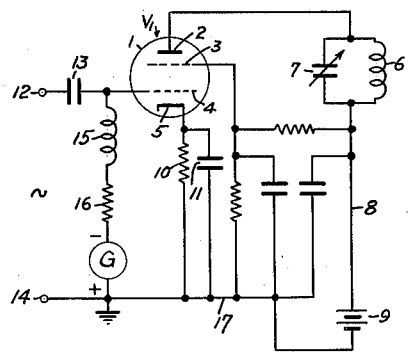
Figure 3:
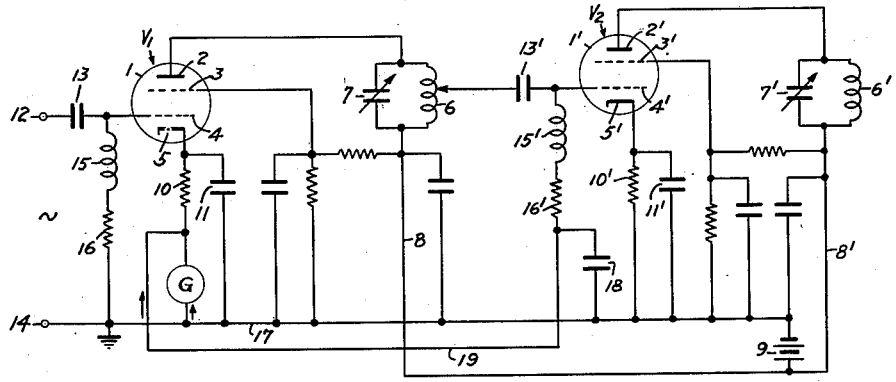

For a better understanding of the present invention reference is had to the following description and claims taken in connection with the accompanying drawing, in which:

Fig. 1 is a circuit diagram of a conventional amplifier with a meter inserted in the space discharge path of the electron discharge tube; and Fig. 2 is a circuit diagram of a conventional amplifier with a meter inserted in the grid circuit of an electron discharge tube; and Fig. 3 is a circuit diagram of an amplifier embodying the novel meter connection which is the crux of my invention.

In the drawings, like elements have been given similar reference numerals.

In Figure 1, I have shown a conventional amplifier tube $V_1$, having an envelope 1, and having an anode 2, a screen grid 3, a control grid 4, and a cathode 5. Associated with the anode of the tube is the tank circuit which consists of an inductance 6 and variable condenser 7. The anode circuit of tube 1 is shown to be series-fed with plate potential over conductor 8 from source 9. Cathode 5 is serially connected to ground over resistance 10 and the meter G. The by-pass condenser 11 completes the cathode circuit. The control grid 4 is connected to the input terminal 12 over a coupling condenser 13. Control grid 4 is connected to radio-frequency choke 15 and leak-bias resistance 16 to complete the grid-return circuit to ground over conductor 17. Conductor 17 is connected to the negative terminal of source 9. A source of exciting voltage (not shown) is adapted to be applied between terminals 12 and 14. Upon application of anode potential from source 9, space current will begin to flow from the negative terminal of source 9 through conductor 17, meter G, resistance 10, cathode 5, the electron space to anode 2, inductance 6, conductor 8, back to the positive terminal of source 9.

In Figure 2, the meter G has been placed in the grid return circuit, that is, it is placed serially between conductor 17 and leak-bias resistance 16. When tube 1 is properly excited by a voltage impressed upon control grid 4, the grid is driven positive over part of the voltage cycle and rectification takes place as in a diode, that is, an electron flow will travel from cathode 5, the electron space, the control grid 4, through radio-frequency choke 15, leak-bias resistance 16, meter G to conductor 17 through cathode resistance 10, to cathode 5. From the current flow path traced in the circuits of Figs. 1 and 2 it will be observed that cathode current flows through the meter G in an opposite direction from rectified grid current. Accordingly, the poling of the meter shown in Fig. 2 is the converse of that shown in Fig. 1.

In Figure 3, I have utilized the reverse polarity of the respective currents flowing in a cathode circuit and a grid circuit to produce the accentuated meter indication as above-mentioned. I have shown the control grid of tube $V_2$ coupled to the tank circuit reactances 6, 7 of tube $V_1$ through coupling condenser 13'. The grid circuit of tube $V_2$ consisting of radio-frequency choke 15', resistance 16', and by-pass condenser 18 is returned to ground over conductor 19 through meter G of tube $V_1$. Thus, any rectified grid current flowing in tube $V_2$ will cause a deflection of meter G. The flow of rectified grid current of tube $V_2$ through the meter G however, is in the opposite direction from the flow of cathode current of tube $V_1$ through the meter G. Thus, the meter reading due to the flow of cathode current through tube $V_1$ will be decreased by the amount of the resonance dip in tube 1 plus the amount of flow of rectified grid current in tube $V_2$. Since maximum grid current and minimum cathode curent coincide, the meter discloses a pronounced resonant dip enabling the operator to carefully adjust to resonance the LC constants of reactances 6, 7 associated with the driving tube $V_1$ and therefore to maximum efficiency.

The algebraic sum of the cathode current and the rectified grid current is obtained, but since the cathode current is far in excess of grid current, the accentuated resonance dip will be composed of the decrease in cathode current plus the rectified grid current, effectively reducing the meter indication cumulatively.

The driving tube $V_1$ may be an amplifier as shown, or it may be an oscillator either of the self-excited type or of the frequency-controlled type.

Additional amplifier tubes may be placed succeeding tube $V_2$. In such a case, a meter would be placed in the cathode circuit of alternate tubes such as $V_1$ and the grid return lead of intervening tubes would be connected to the meter in the cathode circuit of the preceding tube in a manner similar to that described in connection with Fig. 3. One meter may be utilized to indicate resonance of all the tubes in an amplifier by the well-known means of connecting the meter to a multi-point switch. In that event, fixed resistors approximating the internal resistance of the meter would be placed in series with each cathode circuit and the meter upon being switched into a particular circuit would register the voltage drop across such resistors.

While this invention has been shown and described in accordance with the preferred embodiment merely for the purpose of illustration, it is, of course, understood that various modifications may be made and that the features thereof may be applied in many other fields without departing from the scope of the invention as defined in the attended claims.

I claim:

1. A device for indicating resonance of an amplifier having a tunable circuit, comprising means for indicating a reduction of said amplifier space current when said circuit is tuned to resonance and means for accentuating the indication of said indicating means comprising means for rectifying at least a portion of said circuit energy and applying said rectified energy to said indicating means in a direction opposite to that of said space current.

2. A device for indicating resonance of an amplifier having a tunable circuit, as claimed in claim 1, wherein said indicating means comprises a device for indicating the magnitude and direction of said amplifier space current.

3. A device for indicating resonance of an amplifier having a tunable circuit as claimed in claim 1, wherein said means for accentuating the indication of said indicating means comprises an electron discharge tube having an input circuit coupled to said tunable circuit, said input circuit adapted to rectify a portion of said circuit energy.

4. A device for indicating resonance of an amplifier having a tunable circuit as claimed in claim 1, further comprising a source of space current and wherein said indicating means comprises a galvanometer serially connected between said amplifier and said source, and said means for accentuating the indication of said indicating means comprises an electron discharge tube having at least a grid, a cathode and an anode, means for coupling said grid to said tunable circuit, said grid adapted to collect positive ions from said cathode, and means to connect said grid to said indicating means in flow opposition to said space current whereby an algebraic sum of currents are indicated by said indicating means.

HAYES B. STEINHAUSER.

REFERENCES CITED

The following references are of record in the file of this patent:

UNITED STATES PATENTS

| Number | Name | Date |
| --- | --- | --- |
| 2,013,121 | Wheeler | Sept. 3, 1935 |
| 2,333,990 | Dome | Nov. 9, 1943 |
| 2,417,543 | Chapin | Mar. 18, 1947 |